April 29, 1952 G. M. TIMMINS 2,594,598
GARDEN TOOL
Filed Aug. 4, 1949
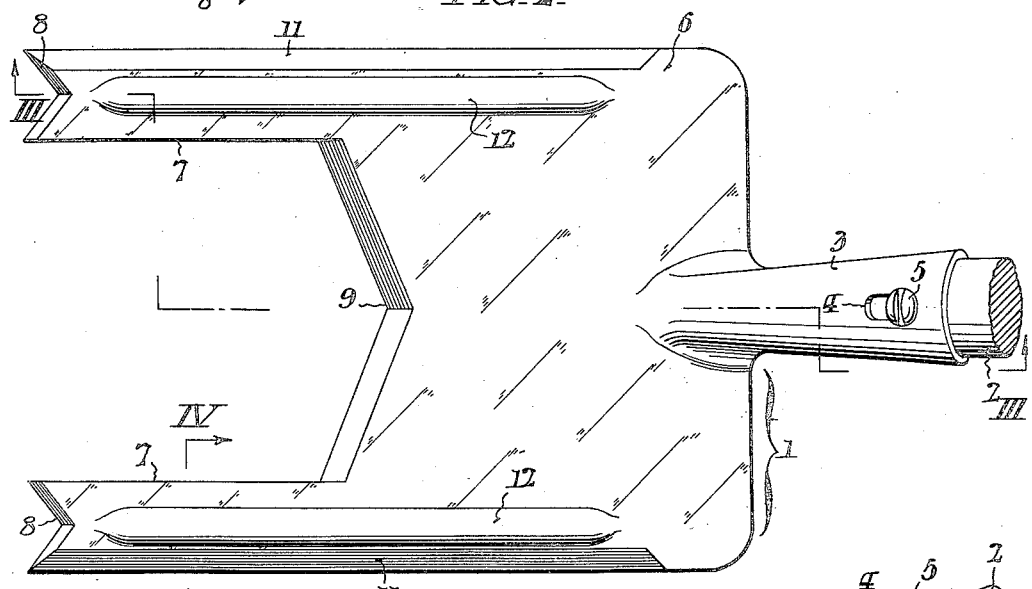
INVENTOR:
George M. Timmins
BY Paul & Paul
ATTORNEYS.

Patented Apr. 29, 1952

2,594,598

UNITED STATES PATENT OFFICE 2,594,598

GARDEN TOOL

George M. Timmins, Ambler, Pa.

Application August 4, 1949, Serial No. 108,533

1 Claim. (Cl. 294—51)

This invention relates to a garden tool and more particularly to a tool of a character which may be very readily and cheaply manufactured and yet will serve efficiently to perform a variety of functions, such as weeding, hoeing, cultivating, root cutting, spading, scything and forking.

Heretofore various forms of multi-purpose tools have been designed in which one part of the tool may be used for one specific purpose and another part for another purpose, the two parts being related physically, but capable only of independent use. The tool of the present invention, differing from other multi-purpose tools in common use or proposed by prior inventors, is characterized by a blade having novel formations, including forwardly projecting prongs, whereby the different elements of the tool are not only individually useful in performing certain functions such as cutting weeds or roots above or below ground, or making furrows; but such elements are also so designed and related to each other that the entire blade has additional or enhanced utility, for example, as cultivator, as a spade, as a fork, as a means for working soil around the roots of plants, and as a means of covering after seeding.

The principal object of the invention is to provide a tool capable of a variety of uses and having such functional unity as indicated above.

Other objects and advantages of the invention, including those derived from simplicity and economy of manufacture, without sacrifice in strength so that the tool may withstand rough usage, will become more fully apparent from the description of one embodiment of the invention which follows hereinafter, having reference to the accompanying drawings, whereof:

Fig. 1 represents a perspective view of the complete tool of my invention;

Fig. 2 represents an enlarged plan view of the blade of the tool;

Fig. 3 represents a staggered longitudinal section of the same taken as indicated by the arrows III—III in Fig. 2; and Fig. 4 represents a transverse sectional view of one of the prongs taken as indicated by the arrows IV—IV of Fig. 2.

In the drawings there is shown an example of the invention in which the tool blade 1 is mounted on the end of a relatively long handle 2 whereby the operator may remain in a standing position at all times while using the tool. The blade 1, which is desirably formed of thin sheet metal so that it may be manufactured by stamping, has integrally formed or attached by welding to its rear end a socket element 3 having diametrically opposed slots 4 whereby the lower end of the handle may be fitted into the socket elements and attached thereto by a bolt 5 passing through the handle and the slots 4. It will be understood, of course, that the size of the blade, the length and shape of the handle and the manner of its attachment to the handle may be varied considerably to suit different needs or desires on the part of the gardener or of the manufacturer of the tool.

The blade 1 is generally rectangular in outline but is bifurcated or cut away centrally at its forward end to form a rearward flat spade-like element 6 with narrow elongated prongs 7 extending forwardly at each side thereof and with a gap between said prongs. The width of this gap is much greater than that of either prong 7, and the gap is wholly unobstructed. Each prong 7 terminates in a concave V-shaped forward cutting edge 8, and the spade-like element 6 terminates in a wider concave V-shaped forward cutting edge 9 extending across the gap from one prong 7 to the other near the transverse center line of the blade. Said V-shaped cutting edges form jaws for cutting roots or the like. Each prong 7 has at the outer side thereof a longitudinally disposed cutting edge 11 which preferably extends from the forward end of the prong to a point near the rear edge of the blade 1. Each prong 7 is further provided with a longitudinal stiffening rib 12 extending continuously throughout a major portion of the length of each prong and rearwardly across the spade-like element 6 throughout a major portion of its length. The prongs 7 are useful for a variety of purposes. They may be used individually with a downward thrust to cut the roots of smaller weeds, dandelions, plantain etc., or, with a dragging movement, to make furrows for seeding. Both prongs may be used to cover after seeding.

The blade 1 as a whole constitutes an effective tool for cutting weeds above ground, and may be swung in the manner of a scythe to bring the right or left hand cutting edges 11 into play. Its spade-like element 6 is of sufficient area to carry substantial quantities of earth. Additionally, the blade 1 may be used very effectively as a fork or as a cultivator, or for working soil around plants with a circular motion. Its wider V-shaped cutting edge 9 is particularly useful for cutting out larger roots, poison ivy etc. As the tool penetrates the earth such roots are confined in the area between the prongs, and with a further downward movement of the tool are brought into the center of the V and there severed.

It will be observed that the presence of cutting edges at each side, at the ends of the prongs and at the forward edge of the spade-like element 6 give the tool additional utility as a digging instrument because rendering it easier to penetrate hard ground. Similarly, there is advantage in the tool having the general outline of a cultivating tool coupled with the specific V-shaped configurations and cutting edges arranged in the manner herein described and illustrated. Each element of the tool serves a number of purposes and its relation to other elements is such as to increase the usefulness of the tool as a whole. To those who are skilled in the art it will also be apparent that the specific uses herein mentioned are merely representative of a wide variety of uses to which the tool may be effectively applied.

While I have described one embodiment of my invention, it will be apparent to those skilled in the art that various changes may be made in the particular form of the tool as herein described without departing from the spirit of the invention as defined in the annexed claim.

What is claimed is:

A garden tool comprising a handle and a thin flat sheet metal blade secured thereto, said blade having a flat spade-portion extending substantially from side to side thereof, a sharp cutting edge of concave V-formation at the forward end of said spade-portion near the transverse center-line of the blade, the apex of the V being substantially at the longitudinal center line of said blade, two prongs extending forwardly from opposite sides of said spade-portion, said sharp cutting edge extending transversely from one prong to the other, wherein an unobstructed space extends between the prongs forwardly of said sharp cutting edge, said space being of much greater width than that of either of said prongs, and each prong terminating in a concave V-shaped forward cutting edge forming a jaw for cutting roots or the like.

GEORGE M. TIMMINS.

REFERENCES CITED

The following references are of record in the file of this patent:

UNITED STATES PATENTS

| Number | Name | Date |
|---|---|---|
| 126,465 | Lake et al. | May 7, 1872 |
| 1,124,046 | Lopez et al. | Jan. 5, 1915 |
| 1,771,207 | Coscioni | July 22, 1930 |
| 2,378,459 | Beardsley | June 19, 1945 |

FOREIGN PATENTS

| Number | Country | Date |
|---|---|---|
| 8,806 of 1909 | Great Britain | Dec. 2, 1909 |